United States Patent Office 3,793,347
Patented Feb. 19, 1974

3,793,347
PROCESS FOR THE SYNTHETIC PRODUCTION OF 2(4,5-DIHYDRO - 5-PROPYL-2(3H)-FURYLIDENE)-1,3-CYCLOPENTANEDIONE
Masaji Ohno, Masaru Okamoto, and Norio Kawabe, Kamakura, Japan, assignors to Zaidan Hojin Biseibutsu Kagaku Kenkyu Kai, Tokyo, Japan
No Drawing. Filed June 10, 1971, Ser. No. 151,968
Claims priority, application Japan, June 22, 1970, 45/53,465; Aug. 21, 1970, 45/72,764
Int. Cl. C07c 5/16
U.S. Cl. 260—347.8                      5 Claims

ABSTRACT OF THE DISCLOSURE

A process for the production of 2-(4,5-dihydro-5-propyl-2(3H)-furylidene)-1,3-cyclopentanedione which comprises reducing 2-[3-(2-furyl)-acryloyl]-1,3-cyclopentanedione with hydrogen in the presence of a base and in the presence of a hydrogenation catalyst, and then reacting the hydrogenation products with an acid.

---

The present invention relates to a process for the production of a novel and useful compound having a physiological activity. More particularly, the present invention relates to a process for the synthesis of a novel and useful compound showing a remarkable effect as a blood pressure reducing agent or hypotensive agent.

The novel compound as produced by the process of the present invention is 2-(4,5-dihydro-5-propyl-2(3H)-furylidene)-1,3-cyclopentanedione which may be represented by the following structural formula:

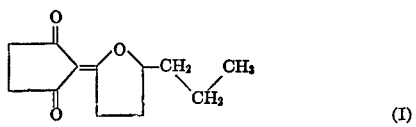

(I)

A biological production of compound of the Formula I under a designation "oudenone" is reported (see Belgian Pat. No. 720,023 applied on Dec. 8, 1970), and it has been found that the compound of the above Formula I has a useful activity of reducing the blood pressure, low toxicity and high biochemical activity of inhibiting the action of tyrosine hydroxylase and inhibiting of bio-synthesis of norepinephrine and can effectively be used for the treatment of hypertensive diseases of humans.

The above-mentioned biological production of the Compound I may be performed by cultivating spore or mycelium of a mushroom which belongs to the genus Oudemansiella radicata and then isolating the useful metabolic compound from the resultant cultured broth or the mycelium of the organism. According to this biological method among two optical isomers, only the levorotatory compound is produced. However, the inventors of the invention here described have discovered that the racemic form or the dextrorotatory form has the same activity as the levorotatory form.

An object of the present invention is to provide an efficient and commercially feasible process of the synthetic production of the Compound I in the racemic form from a starting compound which may easily be prepared and available.

According to the present invention, therefore, we provide a process for the production of 2-(4,5-dihydro-5-propyl-2(3H)-furylidene)-1,3-cyclopentanedione which comprises hydrogenating or reducing 2-[3-(2-furyl)-acryroyl]-1,3-cyclopentanedione with hydrogen in the presence of a base and in the presence of a hydrogenation catalyst, and then treating or reacting the resultant reduction products with an acid.

It is stated that the levorotatory form of the Compound I as produced by the above-mentioned biological method is obtained in the form of white platelets of a melting point of 77–79° C. when recrystallized from hexane or benzene-hexane. This form of the Compound I is not only soluble in water and also in usual organic solvents, and optically active ($[\alpha]_D^{20} = -10.6°$, 0.5% ethanol). Its phosphate buffer (1/15M) solution (10 mcg./cc.) of pH 7.0 shows a maximum absorption at 246 m$\mu$ $$(E_{1\,cm.}^{1\%} = 1000)$$

and its solution (10 mcg./cc.) in 0.1 N HCl shows two maxima at 221 m$\mu$ $$(E_{1\,cm.}^{1\%} = 625)$$

and at 285 m$\mu$ $$(E_{1\,cm.}^{1\%} = 963)$$

in the ultraviolet absorption spectra. It shows the following bands in the infrared spectrum when pelleted with potassium bromide: 3400, 2900, 1710, 1660, 1560, 1255, 1100, 1050, 1015 cm.$^{-1}$. 2-(4,5-dihydro-5-propyl-2(3H)-furylidene)-1,3-cyclopentanedione of the above Formula I has no carboxyl group but it has acidic nature of $\beta$-trione and may form a salt together with various metal cations. In the presence of water and occasionally also of a metal cation $M^{n+}$, the compound of the Formula I is converted through hydration into another of the formulae as shown below.

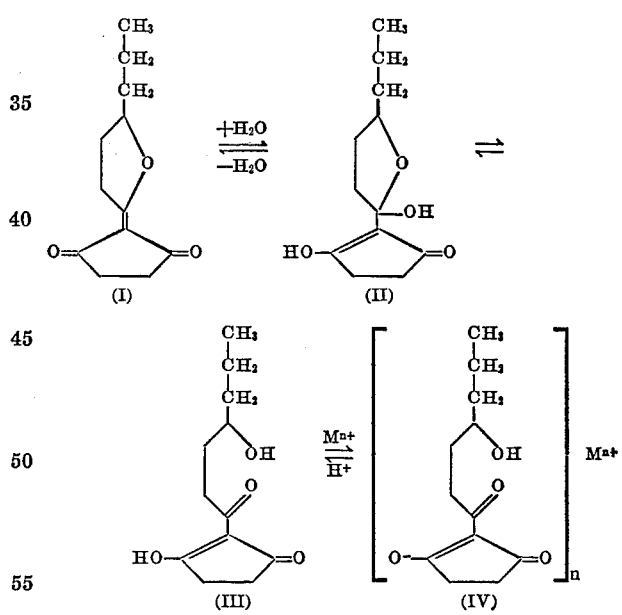

In the above formulae, $M^{n+}$ means a metal cation of the valency $n$ such as mono-valent sodium cation, di-valent calcium cation, etc. 2-(4,5-dihydro-5-propyl-2-(3H)-furylidene)-1,3-cyclopentanedione exists mainly in the form of the Formula I in a solution in a water-immiscible organic solvent such as benzene, acetone, chloroform but it exists in the equibrium-forms of the Formulae I, II and III in neutral aqueous solution and may form a salt of the Formula IV together with a metal cation in a basic aqueous solution having dissolved therein also an alkali or alkaline earth metal hydroxide or carbonate or others. Accordingly the process of the present invention includes the production of 2-(4,5-dihydro-5-propyl-2(3H)-furylidene)-1,3-cyclopentanedione in its hydrated forms (II), (III) as well as in the salt form (IV).

2-[3-(2-furyl)-acryloyl]-1,3-cyclopentanedione which is used as the starting compound for the present process may be represented by the following formula:

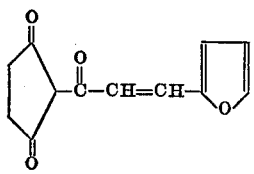

(V)

and may readily be prepared as stated hereafter. This starting Compound V is hereinafter referred to merely as the furan derivative.

In the process of the present invention, this furan derivative as the starting material is subjected to the reduction with hydrogen in the first step and subsequently to the treatment with an acid in the second step. The reduction of the starting furan derivative with hydrogen may be effected in any known manner for the hydrogenation. According to a first preferred embodiment of the invention, however, the process may be carried out as follows: the process is performed by dissolving the furan derivative (V) in an organic solvent for it, hydrogenating the resultant solution with hydrogen passing therethrough under basic conditions in the presence of an organic or inorganic base, and in the presence of a platinum catalyst, and thereafter treating or reacting the resultant hydrogenation products of the furan derivative with an acid. According to a second preferred embodiment of the present invention, the process may be carried out by dissolving or dispersing the starting furan derivative (V) in water or aqueous organic solvent, subjecting the resultant aqueous or aqueous/organic solution or suspension to hydrogenation under basic conditions in the presence of a base and in the presence of developed Raney nickel alloy catalyst while hydrogen is evolved in the reaction medium by the addition of the Raney nickel alloy and thereafter treating or reacting the resultant hydrogenation products of the furan derivative with an acid.

In the first embodiment of the present invention, any organic solvent may be used in the reduction step as long as it dissolves or disperses the furan derivative (V) and does not adversely affect the catalytic hydrogenation. However, methyl alcohol and ethyl alcohol are preferably used in this step.

An inorganic base of a metal of Group I or II of the Periodic Table, for example, sodium hydroxide, potassium hydroxide, calcium hydroxide or barium hydroxide, or an organic base of said metal, for example, sodium methylate, sodium ethylate or potassium butylate may be used as the base the presence of which is provided in the solution of the furan derivative (V). In this case, in order to dissolve the base in the organic solution, an amount of water may be added thereto if desired. It is desirable to add the base so that the base is present in the reaction solution in an amount of not less than 1 mol per mol of the furan derivative (V) or in an amount sufficient to keep the pH of the reaction solution not less than 6.0. It is especially preferable to carry out the hydrogenation in the presence of 1–2 mols of the base per mol of the furan derivative (V).

The hydrogenation reaction may be carried out under conventional conditions for the catalytic hydrogenation. Thus, the hydrogenation step of the process may be effected under an atmospheric pressure or high pressure, preferably of 10–100 kg./cm.², and at room temperature or a higher temperature, preferably of 20–60° C.

The hydrogenation catalyst may be of platinum. The catalyst is normally used in an amount of not more than ½ time the amount of the furan derivative (V) present. The platinum is used as the catalyst in the form of the metal itself, oxide or chloride either alone or supported by a carrier such as carbon.

After the hydrogenation reaction, the catalyst is removed and the solvent is distilled off from the reaction mixture to give a salt of 2-(4-hydroxyheptanoyl)-1,3-cyclopentanedione (IV) as a main product and a salt of a 2-[3-(2-tetrahydrofuryl)-propionyl] - 1,3 - cyclopentanedione (VII) as a by-product.

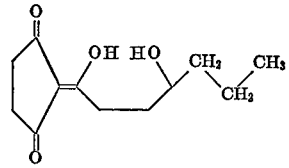

(VI)

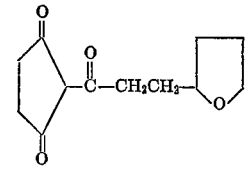

(VII)

These salts exist in colorless stable solid form.

When these salts are then treated or reacted with an acid such as an inorganic acid, hydrochloric acid, sulfuric acid or phosphoric acid, or an organic acid such as acetic acid, formic acid or p-toluene-sulfonic acid and thereafter the reaction mixture is extracted with an organic solvent, 2-(4,5-dihydro-5-propyl-2(3H)-furylidene) - 1,3-cyclopentanedione (I) as the final product and the free form of the tetrahydrofuran derivative (VII) are obtained. These two are separated from each other and purified by chromatography. The conversion between the intermediate product (VI) and the final product (I) is reversible as may be shown by the following equation:

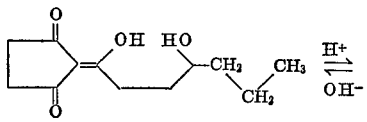

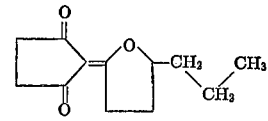

depending on the pH in a system in which they are existing.

This statement with an acid may proceed very smoothly to give the final product (I) and the tetrahydrofuran derivative (VII) when the system is merely made acidic to a pH of not more than 7 by addition of the acid. Accordingly, any acid may be used for this purpose in so far as it gives proton. The acid is necessary to be added in an amount at least sufficient to make the reaction mixture to a pH of not more than 7.

Normally, it is preferable to use the acid in such an amount as to make the reaction mixture to a pH of 2–7. The acid-treating step may be carried out at room temperature, however, the acid treatment may be carried out at a lower or high temperature, but preferably temperature of 10–30° C. is used.

The second preferred embodiment of the present invention is now described in more detail. Thus, in this embodiment the aqueous or aqueous/organic solution or suspension having dissolved therein a suitable concentration of the starting Compound V is added with an inorganic base in an amount at least sufficient to make the reaction mixture under basic conditions, and there is also added thereto an amount of Raney nickel alloy powder. This addition of Raney nickel alloy powder to the aqueous solution or suspension of the starting compound causes hydrogen to be developed through the interaction between the alloy and the water content of the reaction mixture, so that the hydrogenation of the starting compound with the developed hydrogen is effected in the presence of the developed Raney nickel catalyst so added. An inorganic basic compound of a metal of Groups I and II of the Periodic System Table may be used as the base which is to be present in the reaction medium, but an alkali metal hydroxide such as sodium or potassium hydroxide is preferred for this purpose.

It is preferable that the Raney nickel alloy powder to be used as the Raney nickel catalyst is added in an amount of 0.1 to 3 parts by weight of the alloy per one part of the starting furan derivative used. In this second embodiment of the present invention, the hydrogenation step may preferably be carried out at a temperature of 20–100° C. In this hydrogenation step, the starting Compound V is reduced into a salt of 2-(4,5-dihydro - 5 - propyl-2(3H)-furylidene)-1,3-cyclopentanedione (I) as a main product and into a salt of 2-(4,5-dihydro-5-propyl-2(3H)-furyl)-1,3-cyclopentanedione of the Formula VIII as shown below:

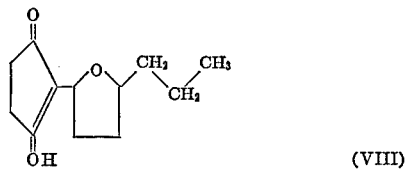

(VIII)

as another product.

After the hydrogenation step, the catalyst is removed out from the reaction mixture in a similar way to the first embodiment of the present invention, and the resultant filtrate containing the above-mentioned salts of the products (I) and (VIII) is treated or reacted with an acid which is added in an amount at least sufficient to make the mixture acidic. This acid treatment may be carried out in the same manner as in the acid treatment step of the first embodiment of the present invention as described before. During the acid treatment, the salt of the product (I) is converted into the free product of the Formula I, namely 2-(4,5-dihydro-5-propyl-2(3H)-furylidene)-1,3-cyclopentanedione through the action of the acid which is used in this treatment. Subsequently, the reaction mixture from the above acid-treatment step is extracted with an organic solvent and the extract is evaporated to give the compound of the Formula I as a crude product. When this crude product separated is purified by silica gel chromatography and alumina gel chromatography, 2 - (4,5-dihydro-5-propyl-2(3H)-furylidene)-1,3-cyclopentanedione is obtained and the Compound VIII is also isolated.

It is possible to easily change the Compound VIII into the aimed 2-(4,5-dihydro-5-propyl-2(3H)-furylidene)-1,3-cyclopentanedione by mild oxidation with halogens such as bromine.

As stated before, the compound of the Formula I as produced by the process of the present invention may exist in its hydrated forms of the Formulae II, III when water is present together, and it also may exist in the form of its salt of the Formula IV when a salt-forming metal cation is present together with water. Accordingly the process of the present invention can occasionally yield 2-(4,5-dihydro-5-propyl-2(3H)-furylidene-1,3 - cyclopentanedione in the other forms of the Formulae II, III and/or IV as the final product, though these other forms of the products may readily be converted into the compound of the Formula I if these are suitably dehydrated or recrystallized from an anhydrous and water-immiscible organic solvent such as benzene or benzene-hexane.

The 2-[3-(2-furyl)-acryloyl] - 1,3 - cyclopentanedione (V) which is used as the starting compound for the process may readily be prepared, for example, by reacting 2-acetyl-1,3-cyclopentanedione with furfural according to a known aldol condensation reaction as shown by the following equation:

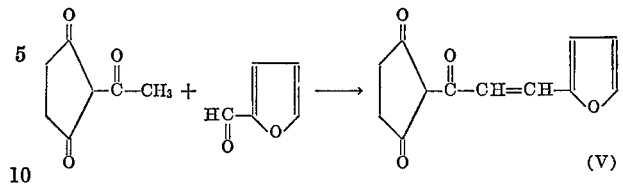

For the preparation of the starting Compound V, the above aldol condensation reaction may be carried out by dissolving 2-acetyl-1,3-cyclopentanedione in its one-fold to ten-fold amount of furfural and treating the resultant solution with a base. The base to be used for this aldol condensation may be any known one in so far as it can cause the aldol condensation to take place, though a secondary amine such as morpholine, piperidine and pyrrolidine are especially preferred for this purpose.

If desired, the aldol condensation may be effected in a solution of the reactants in an inert organic solvent such as methylene chloride, chloroform, benzene and ethyl ether. The aldol condensation may preferably be carried out at a reaction temperature ranging from about 20° C. to about 100° C., and thus 2-[3-(2-furyl)-acryloyl]-1,3-cyclopentanedione may be obtained as yellow colored crystals in yield of 85–95%. In case the aldol condensation is carried out at a temperature higher than 100° C., the product can be decomposed in tars, decreasing the yield of the product.

As shown by the Formula I, the compound synthesized by the process of the present invention has an assymmetric carbon and is the racemic form. The compound was resolved to levorotatory and dextrototatory forms through the brucine salt. By the present invention, it was confirmed that the both forms have the same activity to inhibit tyrosine hydroxylase and to lower the blood pressure. The both forms showed the same toxicity shown by 50% lethal doses to mice and rats.

The racemic compound has now been examined for the biological activity in detail. The compound I which was synthesized and racemic was dissolved in distilled water (pH was 2.3) and administered to mice, $LD_{50}$ was 140 mg./kg. by the intravenous injection, 160 mg./kg. by the intraperitoneal injection, 1000 mg./kg. by the subcutaneous injection and 1200 mg./kg. by the oral administration. When the Compound I (racemic) was dissolved in distilled water and neutralized, $LD_{50}$ was 1250 mg./kg. by the intravenous injection, 1300 mg./kg. by the intraperitoneal injection, 1300 mg./kg. by the subcutanous injection and 2400 mg./kg. by the oral administration. When 160 mg./kg., 40 mg./kg. or 10 mg./kg. of the Compound I was orally or intraperitoneally given daily for 30 days, except decrease of the blood pressure, none of toxic signs appeared.

Effect of the Compound I (racemic) on tyrosin hydroxylase was tested by the following method: the reaction mixture contained 0.1 $\mu$mole of L-tyrosine-$^{14}$C (1.1×10$^5$ c.p.m.), 1 $\mu$mole of 2-amino-4-hydroxy-6,7-dimethyltetrahydropteridine, 0.1 cc. of tyrosinehydroxylase solution (1 mg. as protein/cc.), 200 $\mu$mole of acetate buffer of pH 6.0, 100 $\mu$mole of mercaptoethanol, 100 mcg., 50 mcg., 25 mcg., 12.5 mcg. or 0 mcg. of oudenone in 1.0 cc.; after 15 minutes at 30° C., 3,4-dihydroxyphenylalanine-$^{14}$C was separated by alumina chromatography and determined by the radioactivity. In this test, the following inhibition percent was observed at the following concentrations of the Compound I: 75% at 100 mcg./cc., 55% at 50 mcg./cc., 40.0% at 25 mcg./cc., 30% at 12.5 mcg./cc. This inhibition was not reversed by addition of Fe$^{++}$ at 1×10$^{-3}$ M. When the results were plotted according to Lineweavor-Burk equation, then the Compound I (racemic) showed uncompetitive relation with tyrosine and competitive relation with 2-amino-4-hydroxy-6,7-dimethyltetrahydropteridine.

Hydroxylation of tyrosine is the rate-limiting step of norepinephrine biosynthesis. Therefore, inhibition of tyrosine hydroxylase results in inhibition of norepinephrin synthesis in vivo which results in lowering the blood pressure. If norepinephrine synthesis in brain cells is reduced, it exhibits a sedative effect. The injection of a large dose of the Compound I (racemic) to mice or rats did not cause sleeping and the sedative effect was not recognized. Therefore, it is suggested that blood brain barrier inhibits penetration of the Compound I into brain cells. Daily injection or daily oral administration of the Compound I (racemic) to rats lowered blood pressure. The hypotensive effect can be seen more markedly, when it is given to genetically hypertensive rats which was developed by Prof. Okamoto, Medical School, University of Kyoto. When 6.25 mg./kg. was intraperitoneally injected to a rat of 185 mm. blood pressure and another rat of 205 mm., then the blood pressure was lowered to 115–150 mm. and 150–170 mm. respectively during 1–22 hours after the injection. When 3.13 mg./kg. was injected to a rat of 175 mm., then the pressure was reduced to 140–150 mm. during 1–22 hours after the injection. When 25 mg./kg. was intraperitoneally injected to a rat of 190 mm., the pressure was reduced to 150–165 mm. during 1–22 hours after the injection. The oral administration of the Compound I (racemic) daily (3.1 mg./kg., 6.25 mg./kg., 12.5 mg./kg., 25 mg./kg.) for three days showed marked reduction of blood pressure. It caused 20–30% reduction which continued for about 5 days after the last oral administration.

The Compound I (racemic) inhibits tyrosine hydroxylase and reduces blood pressure. Therefore, the combination with other hypotensive agents causes stronger effect.

The daily administration of 300 mcg. (divided into three times) of the Compound I (racemic) to hypertensive patients for 30 days showed hypotensive effect without any side effect.

The invention is now illustrated by the following examples but to which the invention is not limited.

EXAMPLE 1

This example explains the preparation of 2-[3-(2-furyl)-acryloyl]-1,3-cyclopentanedione.

In a 50 cc. conical flask was charged 10 g. of furfural, to which 27.2 g. of 2-acetyl-1,3-cyclopentanedione was added and to the resultant mixture was gradually added 0.5 cc. of piperidine. When the reaction mixture was heated over steam bath for 5 minutes and allowed to stand at room temperature for 1 hour, depositing yellow crystals. When the crystals were filtered, 1.3 g. of the crystals was collected. Further, 0.5 cc. of piperidine was added to the filtrate and the resultant mixture was heated over a steam bath for 5 minutes and cooled, to give 0.65 g. of the crystals.

When these two crops of the crystals were combined and recrystallized from a mixed solvent of methanol and methylene chloride, 2-[3-(2-furyl)-acryloyl]-1,3-cyclopentanedione was yielded in the form of yellow colored crystals of melting point of 180–181° C. Physical properties and elementary analysis of this crystalline product were determined and shown below:

IR: 3420, 1685, 1610, 1580, 1530, 1020 cm.$^{-1}$.
UV: $\lambda_{max}$ 219 m$\mu$ (12700), 370 m$\mu$ (19250), 400 m$\mu$ (17200).

*Elementary analysis.*—Found (percent): C, 66.14; H, 4.60. Calculated $C_{12}H_{10}O_4$ (percent): C, 66.05; H, 4.62.

Molecular weight.—Found: 224 ($CHCl_3$). Calculated: 218.2.

The above values identified the product as 2-[3-(2-furyl)acryloyl]-1,3-cyclopentanedione (V).

EXAMPLE 2

In a 50 cc. egg-plant shaped flask were charged 3 cc. of water and 0.504 g. of sodium hydroxide, and the content was heated to 60–70° C. on a hot water bath under stirring magnetically. To the resultant solution was added 0.215 g. (1 mmol) of 2-[3-(2-furyl)acryloyl]-1,3-cyclopentanedione. The resultant suspension was vigorously stirred, to which suspension 0.469 g. of Raney nickel alloy powder (Ni:Al ratio was 1:1 by weight in the alloy) was added slowly and in portions in 35 minutes. When the Raney nickel alloy was added, the suspension foamed vigorously owing to the evolution of hydrogen. During this, a small amount of water was added to dissolve and drop down crystals which was adhering to the internal wall surface of the flask. After having added said alloy, an air-cooled Dimroth condenser was fitted on the flask and the suspension was further heated for 2 hours at 90–95° C. with stirring for completion of the reaction. The obtained black grey reaction mixture in the form of suspension was decanted still in hot state to separate the supernatant solution. The solid residue was washed twice with 5 ml. of a hot 2% solution of sodium hydroxide (total 10 cc.) and then with 2 ml. of hot water. The supernatant solution and the washing liquor were combined together and cooled by water.

Subsequently, 5 cc. of concentrated hydrochloric acid was placed in a 100 cc. beaker into which the mixture of the supernatant solution and the washing liquor were added, and the reaction mixture was extracted with 4 portions of 20 cc. of a mixed solvent of ether and methylene chloride (total 80 cc.).

After drying the organic extract, the solvent was distilled off to give 0.155 g. of a yellow colored oily substance. When this substance was separated and purified by silica gel chromatography, there was yielded 26 mg. of crystals of which infrared absorption spectrum was completely identical to that of a known 2-(4,5-dihydro-5-propyl-2(3H)-furylidene)-1,3-cyclopentanedione product which had been separated from the culture of the aforesaid mushroom.

On the other hand, 50 mg. of 2-[3-(2-tetrahydrofuryl)propionyl]-1,3-cyclopentanedione of M.P. 111–112° C. was isolated as the isomer from the other fractions of the eluate of the silica gel chromatography.

The 2-(4,5-dihydro-5-propyl-2(3H)-furylidene)-1,3-cyclopentanedione product of this example inhibited the activity of tyrosine hydroxylase by more than 50% as described before.

EXAMPLE 3

In a 100 cc. flask which was conventionally used for hydrogenation under atmospheric pressure were charged 0.211 g. (0.00528 mol) of sodium hydroxide, 15 cc. of water and 50 cc. of ethanol, to which 1.0 g. (0.00459 mol) of 2-[3-(2-furyl) acryloyl]-1,3-cyclopentanedione was then added. It was hydrogenated in the presence of 0.3 g. of platinum oxide with vigorous stirring under atmospheric pressure. The hydrogenation was continued for 22 hours absorbing about 450 cc. of hydrogen.

After the hydrogenation was completed, the entire reaction mixture was filtered and the solvent was completely removed to give a white solid. This solid was identified as a mixture of a sodium salt of 2-(4,5-dihydro-5-propyl-2(3H)-furylidene)-1,3-cyclopentanedione and a sodium salt of the tetrahydrofuran derivative (VII) in view of its UV, NMR and IR spectra as well as its chemical behaviors.

The white solid was dissolved in water, and to the resultant aqueous solution was added a proper amount of a mixed solvent of ethyl ether and methylene chloride (1:1). The resultant mixture was washed with about 2 N hydrochloric acid and adjusted to pH 1–2, and the organic layer of said mixture was well washed with water and thereafter dried over anhydrous sodium sulfate.

When the ether and the methylene chloride were distilled off, 954 mg. of yellow oily substance was obtained. This oily substance was subjected to silica gel chromatography to give 524 mg. of 2-(4,5-dihydro-5-propyl-2

(3H)furylidene)-1,3-cyclopentanedione as crystals and 280 mg. of the tetrahydrofuran derivative (VII).

This synthetic product 2-(4,5-dihydro-5-propyl-2(3H)-furylidene)-1,3-cyclopentanedione had a melting point of 83–84° C. and the NMR, IR and UV identical to those of the natural product, 2-(4,5-dihydro-5-propyl-2(3H)-furylidene)-1,3-cyclopentanedione which had been isolated from the mushroom culture.

The tetrahydrofuran derivative (VII) obtained was a liquid having a boiling point of 102–105° C./0.08 mm. Hg and showed elementary analysis as shown below.

*Elementary analysis.*—Calculated for $C_{12}HH_{16}O_4$ (percent): C, 64.27; H, 7.19. Found (percent): C, 64.24; H, 7.20.

Molecular weight.—Calculated: 224.25. Found: 227.

EXAMPLE 4

Example 3 was repeated except that the nature and amount of the base used were varied as indicated in the table below. The results obtained are tabulated as follows.

| Base | | Products | |
|---|---|---|---|
| Nature | Amount | A | B |
| KOH | 1.15 | 52 | 32 |
| Ba(OH)$_2$ | 0.7 | 30 | 40 |
| Ca(OH)$_2$ | 0.6 | 32 | 18 |
| NaOCH$_3$ | 1.2 | 48 | 24 |
| NaOC$_2$H$_5$ | 1.2 | 47 | 23 |
| KOC(CH$_3$)$_3$ | 1.2 | 45 | 19 |

NOTE.—Amount of base used is represented by a molar ratio of the base to the starting 2-[3-(2-furyl)-acryloyl]-1,3-cyclopentanedione; "Product A" means 2-(4,5-dihydro-5-propyl-2(3H)-furylidene)-1,3-cyclopentanedione; "Product B" means 2-[3-(2-tetrahydrofuryl) propionyl]-1,3-cyclopentanedione.

EXAMPLE 4

Resolution of the synthetic Compound I

The Compound I synthesized (0.843 g.) from the process of Example 2 was dissolved in 30 cc. of ether and treated with brucine hydrate (1.741 g., 1.0 mol equivalent) dissolved in 12 cc. of tetrahydrofuran. The brucine salt of oudenone more easily precipitated was recrystallized from tetrahydrofuran seven times, showing M.P. 151–153° C. The melting point became constant at the temperature. It was treated with 2 N hydrochloric acid and extracted with a mixed solvent of ether and methylene chloride. The removal of the solvent afforded 182 mg. of d. form, showing $[\alpha]_D^{20} = +10.1$, 0.5% ethanol, M.P. 81–83° C. It showed the same spectra in IR, NMR, and UV as the natural oudenone.

What we claim is:

1. A process for the production of 2-(4,5-dihydro-5-propyl-2(3H)-furylidene) - 1,3 - cyclopentanedione which comprises reducing 2-(3-(2-furyl)-acryloyl)-1,3-cyclopentanedione with hydrogen in the presence of a base and in the presence of a catalytic amount of platinum, platinum oxide or platinum chloride, and then reacting the hydrogenation products with an acid.

2. A process as claimed in claim 1 in which 2-(3-(2-furyl)-acryloyl)-1,3-cyclopentanedione is dissolved in an inert organic solvent; hydrogen is passed through the resultant solution in the presence of said base and said catalyst; the hydrogenation products so formed are separated from the reaction mixture and then treated with an acid, and the reaction mixture from said acid-treatment is subsequently extracted with a water-immiscible organic solvent to recover 2-(4,5-dihydro-5-propyl-2(3H)-furylidene)-1,3-cyclopentanedione.

3. A process as claimed in claim 1 in which the presence of a base is provided by adding to the reaction medium sodium hydroxide, potassium hydroxide, calcium hydroxide, barium hydroxide, sodium alcoholate of 1–3 carbon atoms or potassium alcoholate of 1–3 carbon atoms. or potassium alcoholate of 1–3 carbon atoms.

4. A process as claimed in claim 1 in which the presence of an inorganic base is provided by adding sodium hydroxide or potassium hydroxide to the reaction medium.

5. A process as claimed in claim 1 in which the acid is hydrochloric acid, sulfuric acid, phosphoric acid, formic acid, acetic acid or p-toluenesulfonic acid.

References Cited

Ohno et al., J. Am. Chem. Soc., Mar. 10, 1971, vol. 93, pp. 1286–7.

DONALD G. DAUS, Primary Examiner

B. PENTZ, Assistant Examiner

U.S. Cl. X.R.

424—285; 195—81